United States Patent
Schauerte

(10) Patent No.: US 7,997,559 B2
(45) Date of Patent: Aug. 16, 2011

(54) METHOD AND APPARATUS FOR REPLACING OLD UNDERGROUND CONDUITS

(75) Inventor: Manfred Schauerte, Schmallenberg (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 163 days.

(21) Appl. No.: 12/441,066

(22) PCT Filed: Sep. 7, 2007

(86) PCT No.: PCT/EP2007/007828
§ 371 (c)(1),
(2), (4) Date: Mar. 12, 2009

(87) PCT Pub. No.: WO2008/031536
PCT Pub. Date: Mar. 20, 2008

(65) Prior Publication Data
US 2009/0261310 A1   Oct. 22, 2009

(30) Foreign Application Priority Data
Sep. 13, 2006   (DE) .......................... 10 2006 043 772

(51) Int. Cl.
*H02G 1/08* (2006.01)

(52) U.S. Cl. .......................... 254/134.3 FT; 254/134.3 R
(58) Field of Classification Search ........... 254/134.3 R, 254/134.3 FT, 143.4, 134.5
See application file for complete search history.

(56) References Cited

U.S. PATENT DOCUMENTS

| | | | | |
|---|---|---|---|---|
| 4,842,207 A | * | 6/1989 | Kinnan | 242/390.9 |
| 4,905,773 A | * | 3/1990 | Kinnan | 175/19 |
| 5,570,975 A | * | 11/1996 | Reinert, Sr. | 405/232 |
| 5,645,265 A | * | 7/1997 | Shu | 254/134.3 FT |
| 6,824,329 B2 | * | 11/2004 | Van Bijsterveld et al. | 405/184 |
| 2005/0285088 A1 | * | 12/2005 | Welker | 254/134.3 FT |
| 2009/0261310 A1 | * | 10/2009 | Schauerte | 254/134.3 FT |

FOREIGN PATENT DOCUMENTS

| | | |
|---|---|---|
| DE | 195 04 484 C1 | 9/1996 |
| DE | 198 29 667 C1 | 11/1999 |
| DE | 102 11 833 A1 | 8/2003 |
| EP | 1 088 961 A | 4/2001 |
| GB | 2 386 767 | 9/2003 |

* cited by examiner

*Primary Examiner* — Lee D Wilson
(74) *Attorney, Agent, or Firm* — Henry M. Feiereisen; Ursula B. Day

(57) ABSTRACT

In a method and an apparatus for replacing old underground conduits (4), the old conduit (4) is first laid bare with the aid of a ground drilling device (8) with an overdrilling head and then, in turn, a new conduit (5) is drawn in with the aid of the drill rods (7) and at the same time—in a uniform operating step—the old conduit is pulled out of the ground.

4 Claims, 1 Drawing Sheet

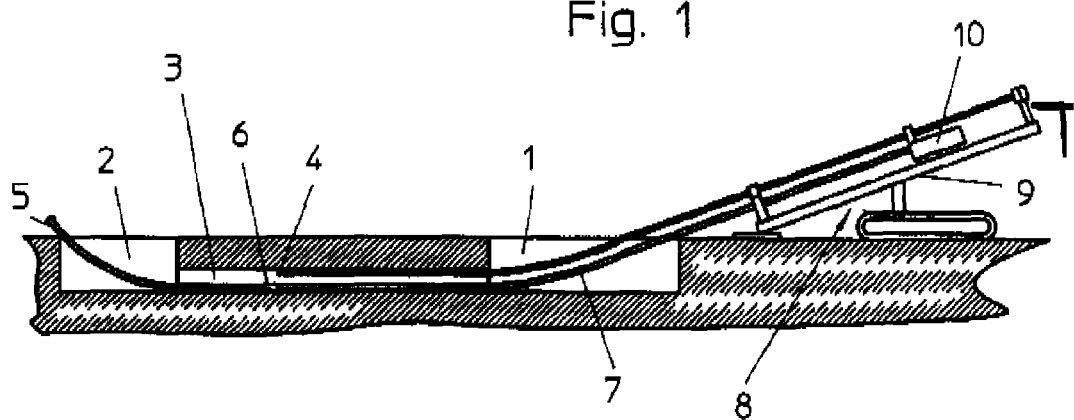
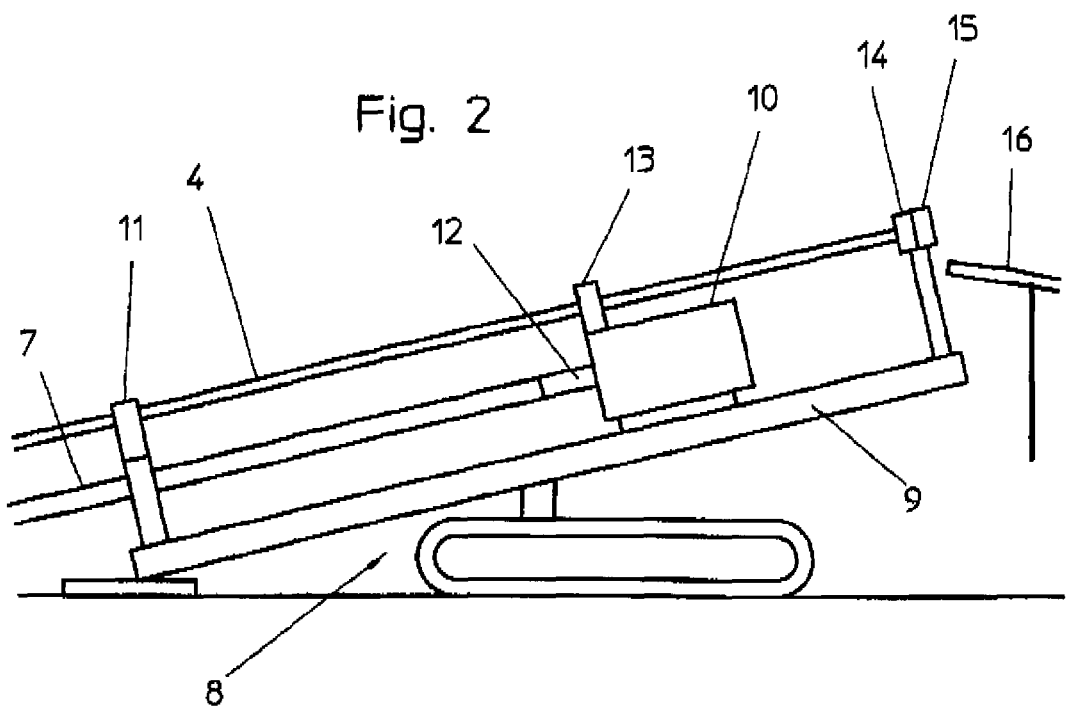

METHOD AND APPARATUS FOR REPLACING OLD UNDERGROUND CONDUITS

CROSS-REFERENCES TO RELATED APPLICATIONS

This application is the U.S. National Stage of International Application No. PCT/EP2007/007828, filed Sep. 7, 2007, which designated the United States and has been published but not in English as International Publication No. WO 2008/031536 and which claims the priority of German Patent Application, Serial No. 10 2006 043 772.1, filed Sep. 13, 2006, pursuant to 35 U.S.C. 119(a)-(d).

BACKGROUND OF THE INVENTION

The invention relates to a method of replacing old underground conduits, which involves initially laying bare the old conduit, without altering its course in the ground, and then removal thereof from the ground and drawing in a new conduit, and which claims the priority of German patent application 10 2006 043 772.1, the content of which is incorporated by reference.

Methods of this type are known; German Patent document 195 04 484 C1 describes a device for removing buried cables with the aid of a ring-shaped drill head moving over the cable and equipped with nozzles for a flushing liquid. Soil surrounding the cable or several cables is washed away with the assistance of the nozzles to thereby expose the cable which then can be pulled out from the ground. The device has an eccentric connection for a hollow rod assembly comprised of individual rod sections connected to one another. The hollow rod assembly meets two tasks; Firstly, it supplies the device with flushing liquid, and secondly, it propels the device between a starting pit on one hand and a destination pit on the other hand.

When the device has washed the conduit free and reached the destination pit, the exposed cable is pulled out of the created borehole and, after removal of the flushing device, a connection adapter is secured to the rod assembly for attachment of one or more conduits. These conduits are then pulled into the flushing borehole with the aid of the rod assembly in the direction of the starting pit.

A further multistage method for trenchless replacement of underground conduits is described in the German patent document 102 11 833 (GB patent document 2 386 767). This device is additionally equipped with a boring bit and a further tool on its rearward end. It lays bare the buried conduit in the described manner and permits the exposed conduit to be pulled out from the flushing borehole. The old conduit can hereby be connected with a new conduit in order to be able to execute in a single operating cycle the withdrawal of the old conduit and the pulling in of the new conduit. How and when the drill rods are removed from the flushing borehole is not described.

SUMMARY OF THE INVENTION

The invention is now based on the problem to technically simplify the afore-described method and thus to improve it with respect to construction as well as cost factor.

This is realized in accordance with the invention by a method of the afore-stated type in which the old conduit, after being laid bare, is pulled out and, at the same time but separately, the new conduit is drawn in.

It is of particular advantage when the pulling of the old conduit is concluded by a preferred continuous commination thereof. A further substantial economic advantage is realized when the old conduit and the new conduit are pulled out of the flushing borehole by a common drive.

This may be implemented by an apparatus having a pulling drive which is movably arranged on a mounting and acts on the flushing head rods as well as on the old conduit. The mounting is preferably provided with a clamping apparatus and/or a guide for the old conduit and the drive is arranged on a carriage. In order to facilitate commination of the old conduit, a clamping apparatus is preferably located behind the drive.

In accordance with the conduit replacement according to the invention, the old conduit, after being washed free, is pulled out of the flushing borehole in a first operating step with the aid of the drive acting in the starting pit and, at the same time, the new conduit is drawn in with the aid of the drill rods. This is implemented in accordance with the structure of the drill rods in single stages having a duration which is governed by the length of the rod members in the second stage of the method.

The particular advantage of the method according to the invention is the fact that it has only two stages and accordingly the withdrawal of the old conduit and the installation of the new conduit is realized at the same time, preferably with a common pulling apparatus.

BRIEF DESCRIPTION OF THE DRAWING

An exemplary embodiment of the invention will now be described in greater detail with reference to the drawing.

The drawings show in

FIG. 1 the simultaneous conduit replacement after the old conduit has been washed free, and FIG. 2 an apparatus for simultaneous pulling in of the new conduit and pulling out of the old conduit.

DETAILED DESCRIPTION OF PREFERRED EMBODIMENTS

A channel which has been washed free in a conventional manner extends between a starting pit 1 and a destination pit 2 and accommodates an old conduit 4 and a new conduit 5 which is connected by a coupling 6 to a rod assembly 7 comprised of one or more members, whereas the old conduit 4 is connected directly or via an not shown intermediate piece, like the rod assembly 7, to a drilling apparatus 8. The drilling apparatus 8 provides propulsion of a not shown drill head, arranged on the forward end of the rod assembly 7, for laying the conduit 4 bare as well as pulling in the new conduit 5 and pulling out the old conduit 4.

More specifically, the apparatus includes a mounting 9 on which a drive 10 is movable to incrementally pull out the rod assembly 7 from the borehole 3 and at the same time to pull in the new conduit 5 via the coupling 6 as well as to pull out the old conduit 4 from the flushing borehole.

This is realized with the aid of the common drive 10 for the rod assembly comprised of single members, on one hand, and for the old conduit 4, on the other hand. To render this possible, the rod assembly 7 and the old conduit 4 extend through a clamping apparatus 11 and then to a rod assembly connection 12 of the common drive 10 and a grab coupling 13 for the old conduit 4. The grab coupling 13 remains closed during rearward movement of the drive 10 and removal of a rod section and opens only when the clamping apparatus 11 is closed to then return the drive 10 from its rearward position to its not shown forward position and to subsequently close again. As a result, one of the clamping apparatuses 11, 13 for the conduit 4 is closed at all times.

A clamping apparatus 14 for the old conduit 4 is provided in the rearward part of the mounting 9 and is placed adjacent a shear 15 by means of which the old conduit 4 is cut into single pieces 16 which can be easily handled.

In summary, an apparatus is involved which is simple in structure and permits a rapid and in particular effective replacement of one or more old conduits with one or also more new conduits and which, compared to conventional apparatuses, eliminates an operating step, namely a separate withdrawal of the exposed old conduit. In addition, the apparatus enables execution of all essential operating steps with a singe device.

What is claimed is:

1. A method of trenchless replacement of a buried old conduit, comprising the steps of:
   connecting a rod assembly to a ground drilling device;
   exposing the buried old pipe; and
   pulling the old conduit out of the ground while at the same time but separately therefrom drawing in a new conduit with the rod assembly in a uniform operating step.

2. The method of claim 1, further comprising the step of comminuting the old conduit as the old conduit is pulled out.

3. The method of claim 1, further comprising operating a common drive to pull the old conduit out of the ground and at the same time to draw in the new conduit.

4. The method of claim 1, further comprising pulling out the old conduit and drawing in the new conduit in increments, and separating a part of the old conduit after each increment, while simultaneously removing a rod member of the rod assembly.

* * * * *